(12) United States Patent
Mummert (10) Patent No.: US 9,808,116 B1
(45) Date of Patent: Nov. 7, 2017

(54) CAMP STOVE

(71) Applicant: Marc Stanley Mummert, Vista, CA (US)

(72) Inventor: Marc Stanley Mummert, Vista, CA (US)

(*) Notice: Subject to any disclaimer, the term of this patent is extended or adjusted under 35 U.S.C. 154(b) by 316 days.

(21) Appl. No.: 14/711,565

(22) Filed: May 13, 2015

Related U.S. Application Data (60) Provisional application No. 61/994,154, filed on May 16, 2014.

(51) Int. Cl.
*A47J 37/00* (2006.01)
*A47J 33/00* (2006.01)

(52) U.S. Cl.
CPC .................... *A47J 33/00* (2013.01)

(58) Field of Classification Search
CPC ........................................... A47J 33/00
USPC ............. 126/25 R, 29, 9 R, 9 B, 44, 45, 48
See application file for complete search history.

(56) References Cited

U.S. PATENT DOCUMENTS

| | | | | |
|---|---|---|---|---|
| 1,411,596 A * | 4/1922 | Tallman | ............... | F24B 1/205 126/29 |
| 2,465,572 A * | 3/1949 | Bramming | ............... | F24C 5/20 126/38 |
| 4,211,206 A * | 7/1980 | Darbo | ............... | A47J 37/0763 126/25 R |

* cited by examiner

*Primary Examiner* — Vivek Shirsat (57) ABSTRACT

A stove that has tiered wings allowing for different sized cooking pots, and that is fully collapsible based on tab-in-slot construction, allowing for completely flat storage and easy replacement of panels.

20 Claims, 9 Drawing Sheets

CAMP STOVE

RELATED APPLICATIONS

This application relates to U.S. Provisional Application No. 61/994,154, filed May 16, 2014, entitled CAMP STOVE, the contents of which are incorporated by reference herein.

BACKGROUND

Portable stoves come in varieties of designs for different uses (e.g., camping). Most stoves use a fuel tank that connects to a burner that outputs a heat source (e.g., a flame) for cooking. Such stoves have several disadvantages. For example, they are often large and heavy. Also, fuel tanks often run out of fuel, and such stoves do not permit a user to use other sources of fuel (e.g., wood). Accordingly, there is a need for improved stoves of reduced size and weight, and that work with different types of fuel including not only the fuel tanks, but wood as well.

SUMMARY

One stove relates to the field of portable stoves. More specifically, the disclosure focuses on collapsible camp stoves that offer different cooking surfaces.

REFERENCE NUMERALS IN THE DRAWING

10 Stove
12 Side panel ("wall")
14 Side panel ("wall")
16 Side panel ("wall")
18 Side panel ("wall")
20 Side panel ("wall") with door cutout
22 Base plate ("base")
24 Door
26 Upper door tab
28 Lower door tab
30 Air vents
32 Door handle
34 Flame disbursement vent
36 Upper panel ("wall-linking") tab
38 Lower panel ("wall-linking") tab
40 Air vents
42 Bottom ("base-linking") tab
44 Bottom ("base-linking") tab
46 Air vents
48 Lower panel slot
50 Logo cutout
52 Upper panel slot
54 Tiered wing ("support with notches")
56 Flame disbursement vent
58 Upper panel ("wall-linking") tab
60 Lower panel ("wall-linking") tab
62 Air vents
64 Bottom ("base-linking") tab
66 Bottom ("base-linking") tab
68 Air vents
70 Lower panel slot
72 Logo cutout
74 Upper panel slot
76 Tiered wing ("support with notches")
78 Flame disbursement vent
80 Upper panel ("wall-linking") tab
82 Lower panel ("wall-linking") tab
84 Air vents
86 Bottom ("base-linking") tab
88 Bottom ("base-linking") tab
90 Air vents
92 Lower panel slot
94 Logo cutout
96 Upper panel slot
98 Tiered wing ("support with notches")
100 Flame disbursement vent
102 Upper panel ("wall-linking") tab
104 Lower panel ("wall-linking") tab
106 Air vents
108 Bottom ("base-linking") tab
110 Bottom ("base-linking") tab
112 Air vents
114 Lower panel slot
116 Logo cutout
118 Upper panel slot
120 Tiered wing ("support with notches")
122 Flame disbursement vent
124 Upper panel ("wall-linking") tab
126 Upper door slot
128 Lower door slot
130 Lower panel ("wall-linking") tab
132 Bottom ("base-linking") tab
134 Bottom ("base-linking") tab
136 Lower panel slot
138 Door cutout ("opening")
140 Logo cutout
142 Upper panel slot
144 Tiered wing ("support with notches")
146 Base plate slot
148 Base plate slot
150 Base plate slot
152 Base plate slot
154 Base plate slot
156 Base plate slot
158 Base plate slot
160 Base plate slot
162 Base plate slot
164 Base plate slot
166 Notches/tiers
168 Notches/tiers
170 Notches/tiers
172 Notches/tiers
174 Notches/tiers

DETAILED DESCRIPTION

Figure 1:
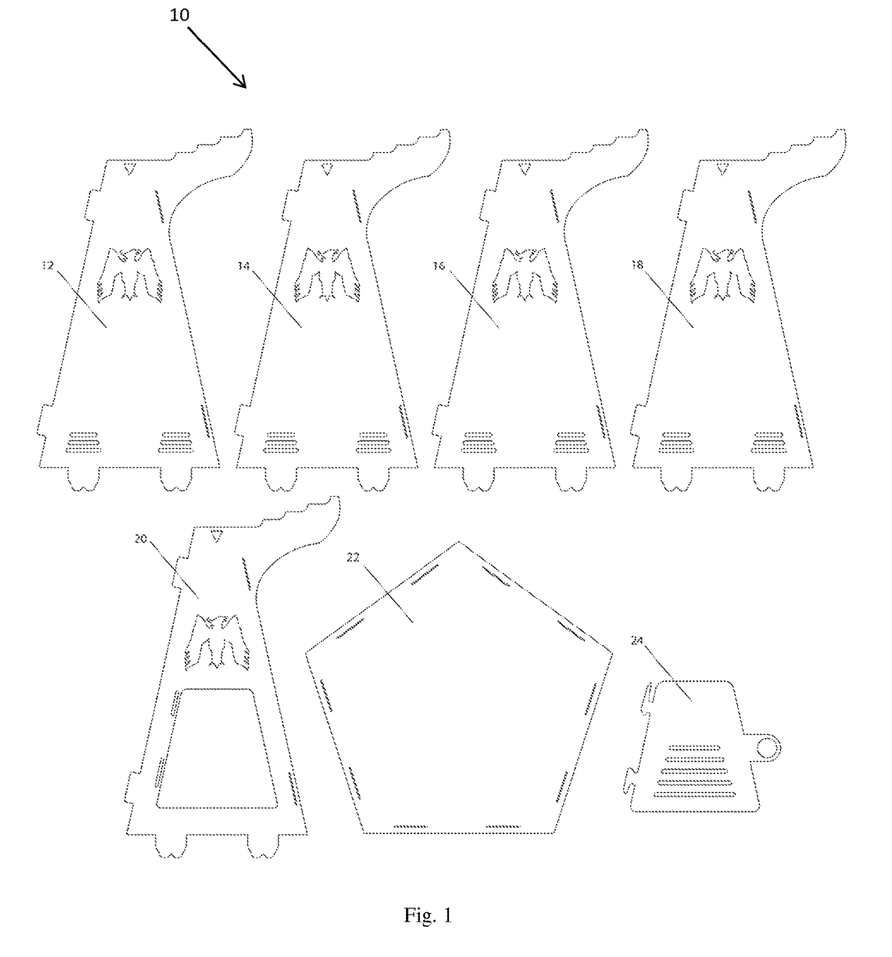
FIG. 1 is a perspective view of disassembled panels of one stove.
Figure 2:
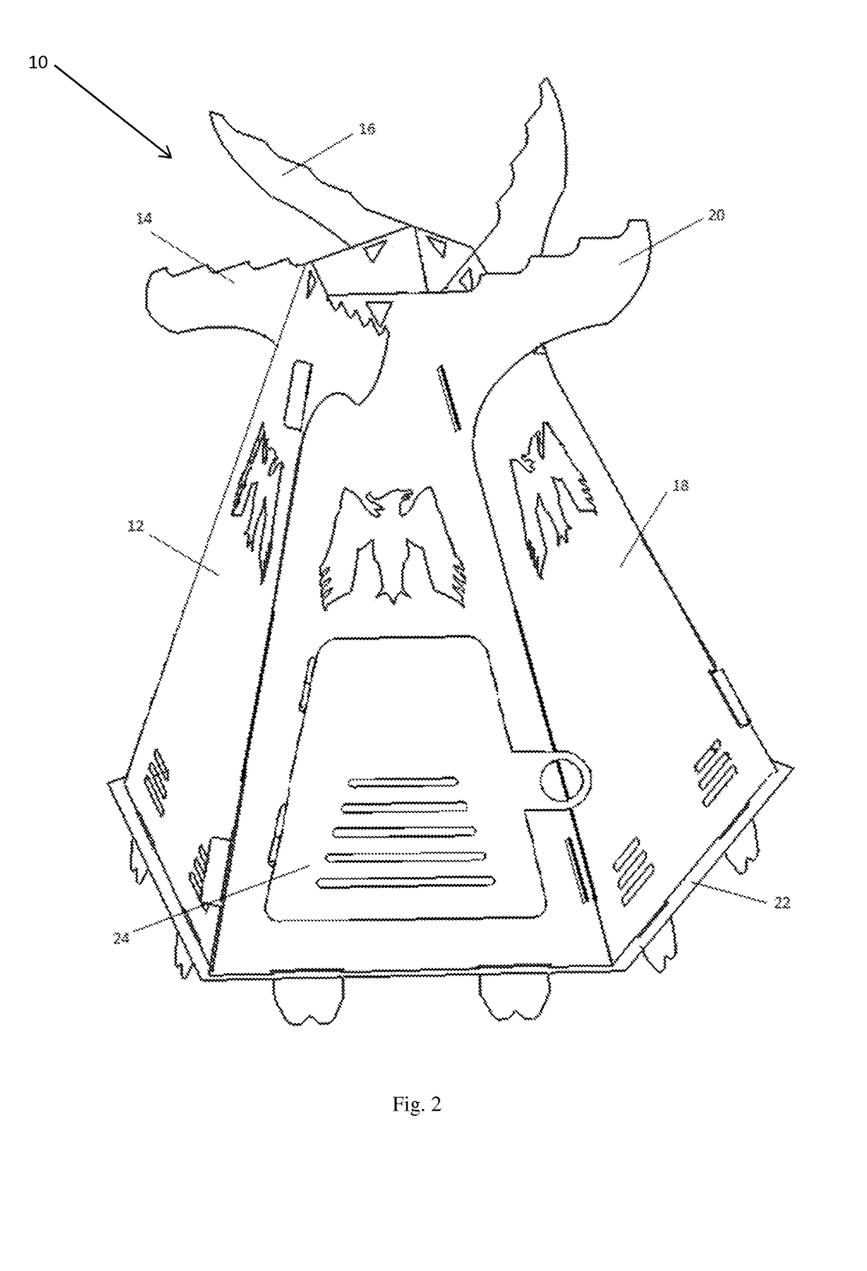
FIG. 2 is a side view of an assembled stove.
Figure 3:
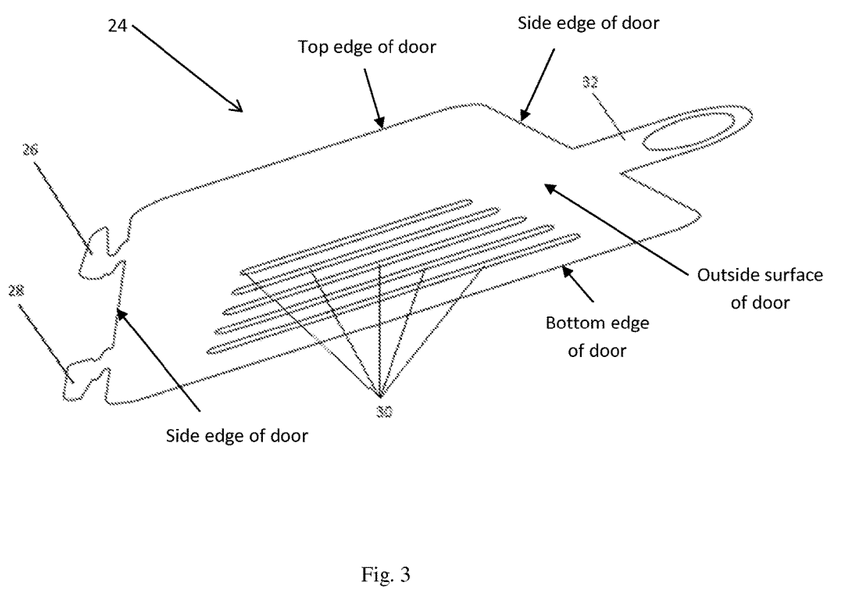
FIG. 3 is a close-up view of the door with bent door tabs of one stove.
Figure 4:
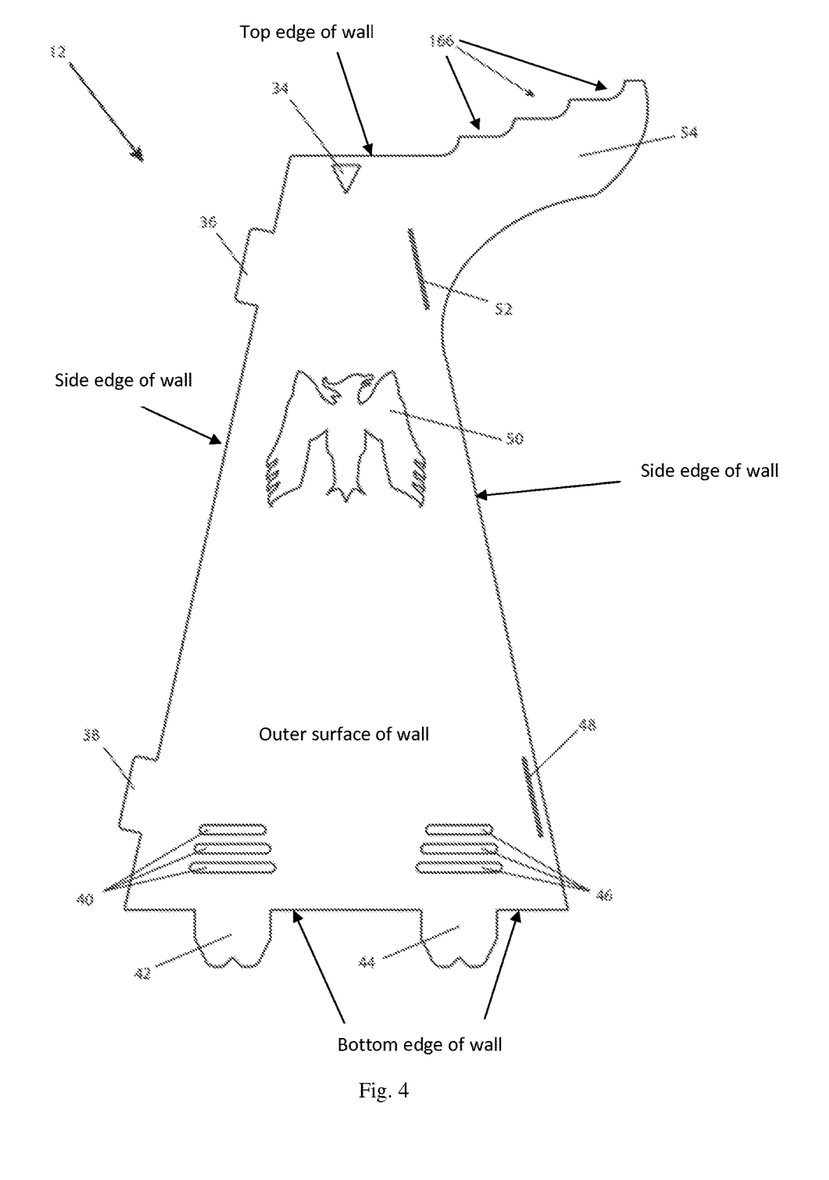
FIG. 4 is a side panel (or "wall") of one stove.
Figure 5:
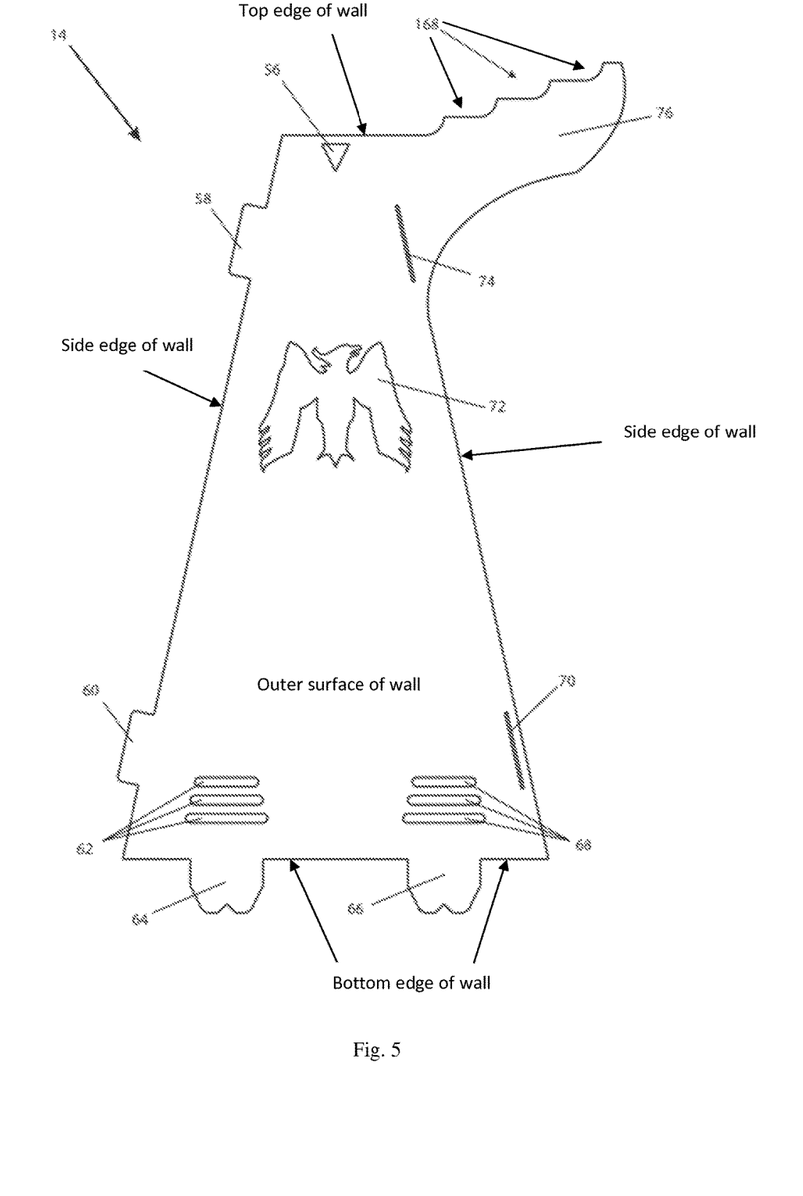
FIG. 5 is a side panel of one stove.
Figure 6:
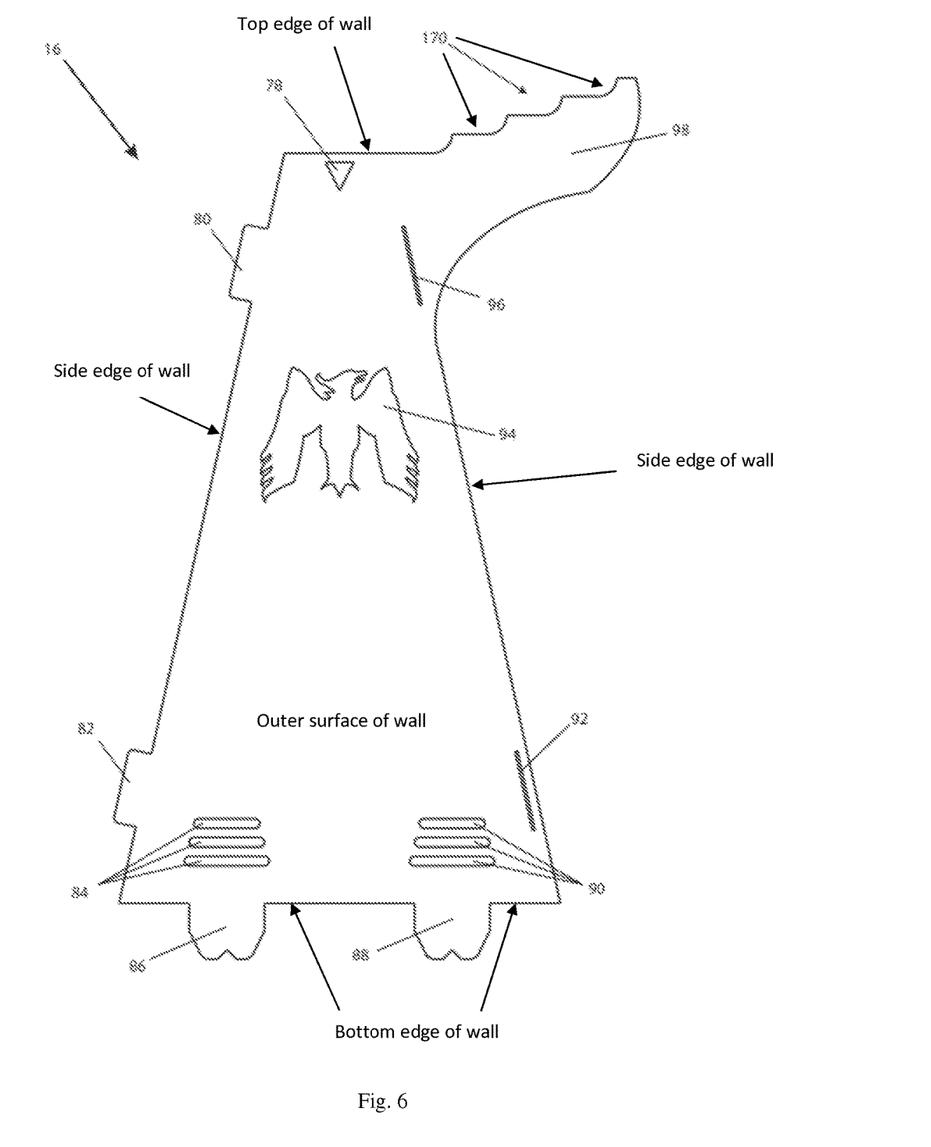
FIG. 6 is a side panel of one stove.
Figure 7:
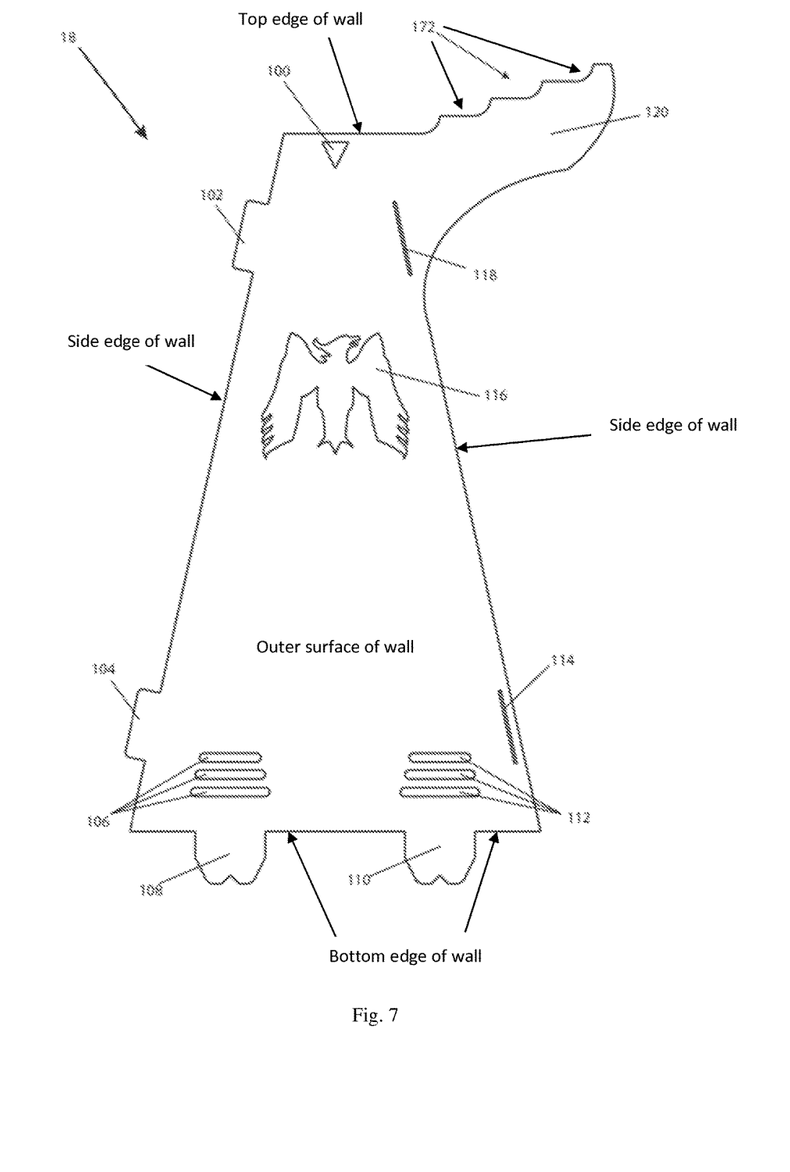
FIG. 7 is a side panel of one stove.
Figure 8:
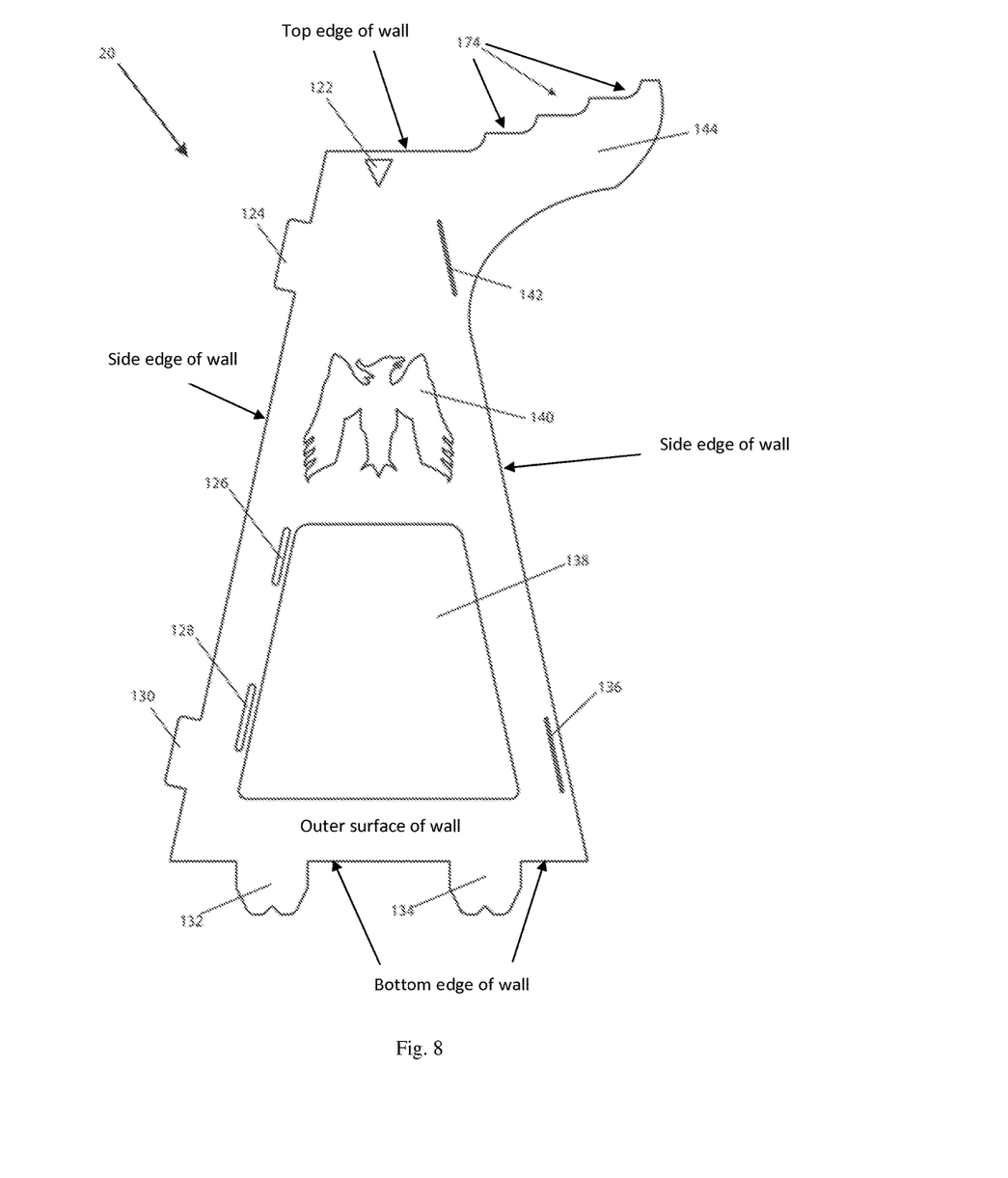
FIG. 8 is a side panel with door cutout of one stove.
Figure 9:
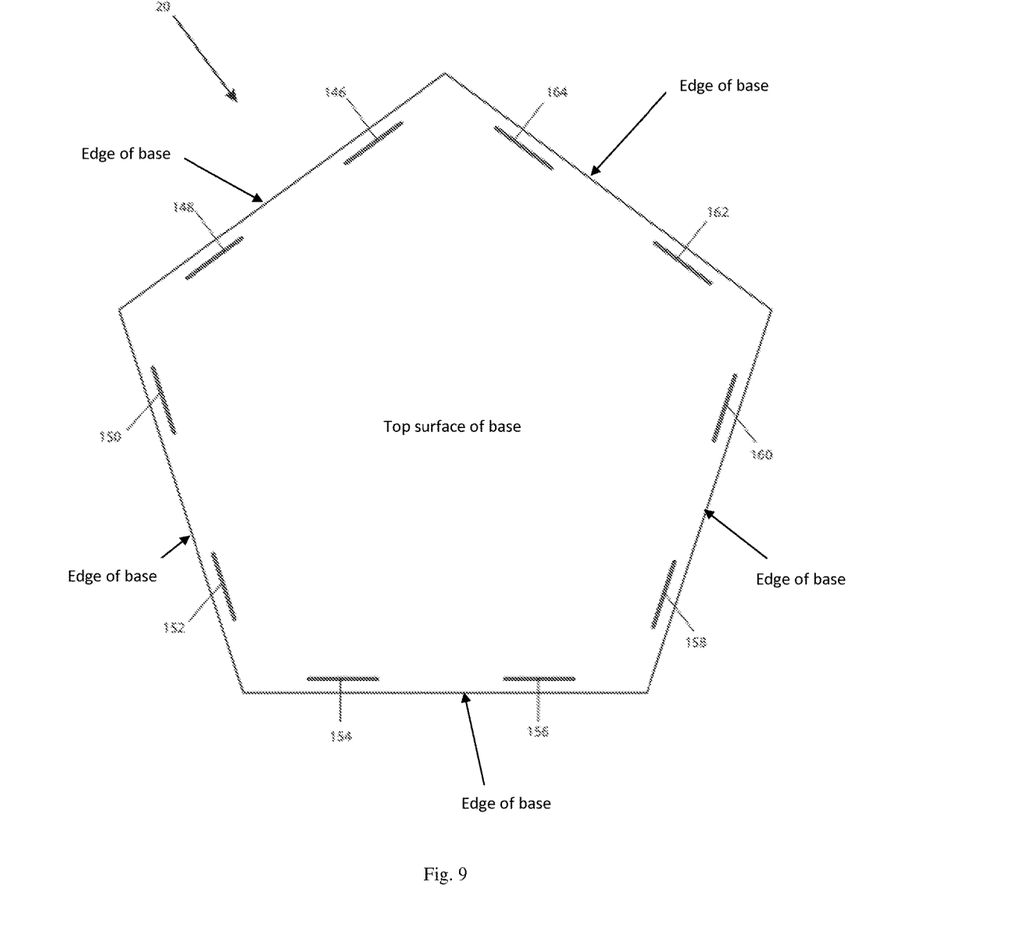
FIG. 9 is a base plate (or "base") of one stove.

FIG. 1 shows all individual parts of a collapsible camp stove 10, and FIG. 2 offers three-dimensional view of camp stove 10 once assembled.

As shown, the camp stove 10 including five side panels (or "walls") 12, 14, 16, 18 and 20, a pentagonal base plate 22, and a door 24. All side panels 12, 14, 16, 18, 20 have the same outline. As will be shown and described in relation to later figures, side panel 20 differs from side panels 12, 14, 16, 18 by the lack of air vents, the addition of a door cutout (or "opening"), and door slots sized to receive door tabs of the door 24. The base plate 22 has pairs of slots 146 and 148, 150 and 152, 154 and 156, 158 and 160, 162 and 164 cut out along each of the five sides (or "edges"). These slots may be aligned slightly closer to one edge than the other.

Reference is now made to FIGS. 3 through 9 in addition to FIGS. 1 through 2.

All parts 12, 14, 16, 18, 20, 22, 24 are assembled via a tab-in-slot design to form the camp stove 10 shown in FIG. 2. Assembly is accomplished by positioning base plate 22 flat in such a way that the off-centered base plate slots 146 and 148, 150 and 152, 154 and 156, 158 and 160, 162 and 164 are to the right of center on each side. Bottom ("base-linking") tabs 42, 44 of side panel 12 are inserted into any pair of base plate slots 146 and 148, 150 and 152, 154 and 156, 158 and 160, or 162 and 164 that are located along the same edge of the base plate 22 with the tiered wing 54 ("support with notches") pointing towards the right (or the left in some embodiments). The bottom ("base-linking") tabs 64, 66, 86, 88, 108, 110, 132, 134 of the remaining side panels 14, 16, 18, 20 are inserted in the unoccupied base plate slots 146 and 148, 150 and 152, 154 and 156, 158 and 160, or 162 and 164, ensuring that all side panels 12, 14, 16, 18, 20 follow the same alignment of the tiered wings 54, 76, 98, 120, 144 as described above, positioned towards the right (or the left). To construct the pentagonal open pyramid shown in FIG. 2, each side panel 12, 14, 16, 18, 20 connects with its adjacent panels via tab-in-slot functionality. The lower panel ("wall-linking") tabs 130, 38, 60, 82, 104 slide in the lower panel slots 48, 70, 92, 114, 136 of the adjacent side panel 12, 14, 16, 18, 20. Next, the upper panel ("wall-linking") tabs 124, 36, 58, 80, 102 insert in the same way into the upper panel slots 52, 74, 96, 118, 142 of the adjacent side panel 12, 14, 16, 18, 20.

After assembly, the bottom ("base-linking") tabs 42, 44, 64, 66, 86, 88, 108, 110, 132, 134 function as support legs that lift the base plate 22 off the ground.

The door tabs 26 and 28 of the door panel 24 may be formed as an s-bend, which allows it to function as a hinge. In other embodiments, a bend is not necessary. In order to attach the door panel 24 to the side panel 20, the upper door tab 26 and the lower door tab 28 may be inserted into the upper door slot 126 and lower door slot 128. When the door 24 is attached to the assembled camp stove 10, as shown in FIG. 2, gravity will force it shut unless held open, due to the angled position of the side panel 20 relative to the base plate 22. This reduces the risk of large sparks or embers emitting during use, increasing the safety of the unit. The tab-in-slot design of the door 24 also allows for easy removal of door panel 24, facilitating prolonged access to the interior of the stove when needed.

Of course, the slots 126 and 128, and the door tabs 26 and 28 can be reversed, such that the side panel 20 includes the tabs, and the door panel 24 includes the slots.

The tab-in-slot design allows for fast assembly and disassembly, compactness in disassembled form, and easy panel replacement in case of damaged parts. Furthermore, the tiered-wings 54, 76, 98, 120, 144 (where each tier is a different notch) of the side panels 12, 14, 16, 18, and 20 create cooking surfaces with various circumferences.

While the foregoing written description of the disclosure enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

The number of side panels and the number of sides/edges of the base plate may be varied. For example, there may be three, four, five or any number of side panels and corresponding base plate edges.

The size position, and number of tabs and corresponding slots may be varied. For example, there may be one, two, or any number of tabs and corresponding slots. The tabs and slots may be shorter, longer, thinner, wider or other differences in sizes. The tabs and slots may be at different positions than shown in the figures while still permitting adjacent panels/plates to couple to each other using those tabs and slots.

The shapes of the side panels, base plate and door may vary so long as those shapes permit tabs and slots of adjacent items to couple to each other. As shown in the figures, the top edges and the bottom edges of the side panels are different lengths such that the side edges of the side panels are not parallel. Of course, the top edges and the bottom edges of the side panels can be the same length such that the side edges of the side panels could be parallel. The side panels may also be non-flat (e.g., curved) so that the different sides of the assembled stove are not the flat sides shown in the figures. For example, each of two, three, four and n side panels could form ½, ⅓, ¼ and 1/n parts of circle. However, it is noted that having curved side panels may increase the dissembled profile of the stove such that it occupies more space. Where the side panels are non-flat, the edge(s) of the base may be formed along a similar shape (e.g., the base has one continuous edge that forms a circle). Also, where the side panels are non-flat, the door may be formed using a similar shape. Furthermore, the base's slots and the base-linking tabs of the side panels may also be curved.

Similarly, the shapes of the supports with notches (i.e., the tiered wings) may be varied. For example, the height and width of the notches may be smaller or larger. In one embodiment, each tiered wing may not be integral with a side panel such that each tiered wing may also include tabs or slots that couple to corresponding slots or tabs of a side panel.

Alternatives to the tab-and-slot configuration shown in the figures are also contemplated, including configurations where the slots extend through a tab-like protrusion that extends away from the edge of the side panel and/or base plate.

The size and position of the vents may also be varied.

The camp stove may be made of different materials, including metal, ceramic and other suitable materials.

Attention is now given particular embodiments of stoves.

In one embodiment, a camp stove includes: a base that includes (i) a top surface, (ii) a bottom surface, (iii) edges, and (iv) slots extending through the base between the top surface and the bottom surface of the base; walls that each include: (i) an outer surface, (ii) an inner surface, (iii) one or more base-linking tabs extending from a bottom edge, (iv) one or more wall-linking tabs extending from a first side edge, (v) one or more slots extending through the wall between the outer surface and the inner surface, and (vi) a support portion extending from one of the side edges; a door that includes: (i) an outside surface, (ii) an inside surface, (iii) edges, and (iv) one or more door tabs extending from one of the edges.

In one embodiment, one of the walls includes (i) an opening, and (ii) one or more slots positioned to receive the one or more door tabs.

In one embodiment, the base and the walls are separate parts of the camping stove that are coupled to each other using the slots of the base, the base-linking tabs of the walls, the slots of the walls, and the wall-linking tabs of the walls.

In one embodiment, the slots of the base are sized to receive the base-linking tabs of the walls. In one embodiment, the walls couple to the base by insertion of the base-linking tabs of the walls into the slots of the base.

In one embodiment, the slots of each wall are sized to receive the wall-linking tabs of another wall. In one embodiment, each wall couples to a different pair of the walls by insertion of the wall-linking tabs of that wall into the slots of a first wall from the pair, and also by insertion of the wall-linking tabs of a second wall from the pair into the slots of that wall.

In one embodiment, the support portion includes notches at different positions to support cooking vessels of different sizes.

In one embodiment, there are 10 slots extending through the base, and each of the walls includes two base-linking tabs that are sized to be inserted into different pairs of the 10 slots.

In one embodiment, the number of edges of the base is equal to the number of the walls. In one embodiment, there are four walls. In one embodiment, there are five walls.

In one embodiment, each wall includes two base-linking tabs, two wall-linking tabs, and two slots.

In one embodiment, the top surface of the base and the bottom surface of the base are of equal dimension, and wherein each of the base's edges are of equal length.

The camping stove of claim 1, wherein the number of the base's slots equals the number of the base-linking tabs for all of the walls.

In one embodiment, each of at least two of the walls includes vent openings above the base-linking tabs.

In one embodiment, the door includes a handle extending from an edge that is opposite to the edge from which the door tabs extend.

In one embodiment, each wall includes a first wall-linking tab and a first slot, and wherein the middle of the first wall-linking tab and the middle of the first slot are positioned at a first same height above the bottom edge.

In one embodiment, each wall includes a second wall-linking tab and a second slot, and wherein the middle of the second wall-linking tab and the middle of the second slot are positioned at a second height above the bottom edge.

In one embodiment, the longest dimension of each of the base's slots is parallel to one of the base's edges.

In one embodiment, the longest dimension of each wall's slots is parallel to a second side edge of that wall.

Various embodiments are contemplated for different supports with notches (also referred to as wings with tiers or "tiered wings"). Each notch is formed by a horizontal edge and a vertical edge (as shown, e.g., in FIGS. 4-6), where there may be a curved transition from one edge to the other (or where the vertical edge is curved). The collection of horizontal and vertical edges forms a top edge of the support (as shown, e.g., in FIG. 8).

For a particular wall, each notch may be offset from other notches in two dimensions. By way of example, each notch may be offset from other notches in horizontal and vertical dimensions as shown in the figures (where the offsets can be considered from any point between the start of the horizontal edge and the end of the vertical edge).

In the figures, notches that are positioned to receive larger cooking vessels are to the right and above notches that are positioned to receive smaller cooking vessels (on a relative scale). Collectively, when considering multiple walls, notches at the same position on the walls create a support surface for sizes of cooking vessels that fall with a particular range of sizes. The vertical and/or horizontal offset from neighboring notches can vary depending on the embodiment. For example, the height of the vertical edges can be shorter or taller than shown.

In one embodiment, no notches are present such that there is one long horizontal edge that supports the various cooking vessel sizes supported by the different notches of other embodiments shown in the figures. In this embodiment, there is no vertical dimension of the top surface (as illustrated, e.g., by the dotted line labeled "i" in FIG. 7). In an alternative embodiment, no notches are present such that there is a top edge that is flat, but spans upward and to the right from a first horizontal and vertical coordinate to a second horizontal and vertical coordinate surface (as illustrated, e.g., by the dotted line labeled "ii" in FIG. 7).

Advantages of the camp stoves described herein include an ability to be used with different fuels like wood and similar fuel sources that may be inserted through the door and placed inside the walls of the stove. Typical propane camp stoves cannot use such fuel sources like wood. Alternatively, a hole may be formed in the center of the base plate so a fuel source may be burned from underneath the base plate (where the flame passes through the hole), or so that a fuel source (e.g., a gas or gel tank) can be inserted into the camp stove (or the camp stove can be inserted over that fuel source).

Attention is now given methods of manufacturing stoves disclosed herein. Various manufacturing methods comprise forming different combinations of the items described above. For example, one method of manufacture comprises: forming a base that includes (i) a top surface, (ii) a bottom surface, (iii) edges, and (iv) slots extending through the base between the top surface and the bottom surface of the base; forming walls that each include: (i) an outer surface, (ii) an inner surface, (iii) one or more base-linking tabs extending from a bottom edge, (iv) one or more wall-linking tabs extending from a first side edge, (v) one or more slots extending through the wall between the outer surface and the inner surface, and (vi) a support portion extending from one of the side edges; forming a door that includes: (i) an outside surface, (ii) an inside surface, (iii) edges, and (iv) one or more door tabs extending from one of the edges; and forming one of the walls so it includes (i) an opening, and (ii) one or more slots positioned to receive the one or more door tabs.

The invention claimed is:
1. A camping stove, comprising:
   a base, wherein the base includes
     (i) a top surface,
     (ii) a bottom surface,
     (iii) edges, and
     (iv) slots extending through the base between the top surface and the bottom surface of the base;
   at least three walls, wherein each of the at least three walls includes
     (i) an outer surface extending along a surface plane,
     (ii) an inner surface,

(iii) one or more base-linking tabs extending from a bottom edge,
(iv) one or more wall-linking tabs extending from a first side edge,
(v) one or more slots extending through the wall between the outer surface and the inner surface, and
(vi) a support portion extending from a second side edge, wherein the second side edge is located opposite the first side edge, wherein the support portion includes tiered notches, and wherein each of the tiered notches includes a horizontal edge and a vertical edge, wherein the support portion includes part of the outer surface extending along the surface plane; and a door, wherein the door includes
(i) an outside surface,
(ii) an inside surface,
(iii) edges, and
(iv) one or more door tabs extending from one of the edges, wherein one of the at least three walls further includes:
(i) an opening, and
(ii) one or more slots positioned to receive the one or more door tabs.

2. The camping stove of claim 1, wherein the base and the walls are separate parts of the camping stove that couple to each other using the slots of the base, the base-linking tabs of the walls, the slots of the walls, and the wall-linking tabs of the walls.

3. The camping stove of claim 1, wherein the walls couple to the base by insertion of the base-linking tabs of the walls into the slots of the base.

4. The camping stove of claim 1, wherein the slots of each wall are sized to receive the wall-linking tabs of another wall.

5. The camping stove of claim 4, wherein each wall couples to a different pair of the walls by insertion of the wall-linking tabs of that wall into the slots of a first wall from that pair, and also by insertion of the wall-linking tabs of a second wall from that pair into the slots of that wall.

6. The camping stove of claim 1, wherein the tiered notches of the support portion are positioned to support cooking vessels of different sizes.

7. The camping stove of claim 1, wherein there are at least 10 slots extending through the base, at least five walls, and each of the walls includes two base-linking tabs that are sized to be inserted into different pairs of the at least 10 slots.

8. The camping stove of claim 1, wherein the number of edges of the base is equal to the number of the walls.

9. The camping stove of claim 8, wherein there are four walls.

10. The camping stove of claim 8, wherein there are five walls.

11. The camping stove of claim 1, wherein each wall includes at least two base-linking tabs, two wall-linking tabs, and two slots.

12. The camping stove of claim 1, wherein the top surface of the base and the bottom surface of the base are of equal dimension, and wherein each edge of the base is of equal length.

13. The camping stove of claim 1, wherein the number of the slots in the base equals the number of the base-linking tabs for all of the walls.

14. The camping stove of claim 1, wherein each of at least two of the walls includes at least one vent openings above the base-linking tabs of that wall.

15. The camping stove of claim 1, wherein the door includes a handle extending from an edge that is opposite to the edge from which the door tabs extend.

16. The camping stove of claim 1, wherein each of the walls includes a first wall-linking tab and a first slot, and wherein a middle of the first wall-linking tab and a middle of the first slot are positioned at the same height above the bottom edge of that wall.

17. The camping stove of claim 1, wherein the longest dimension of each of the slots in the base is parallel to one of the edges of the base.

18. The camping stove of claim 1, wherein the longest dimension of each of the slots in the wall is parallel to the second side edge of that wall.

19. The camping stove of claim 1, wherein each of the walls includes at least three tiered notches, wherein the horizontal edges and the vertical edges of the three tiered notches form a top edge of the support that extends from the second side edge.

20. The camping stove of claim 1, wherein the first side edge and the second side edge are not parallel.

* * * * *